(12) United States Patent
Kubo

(10) Patent No.: US 6,720,559 B2
(45) Date of Patent: Apr. 13, 2004

(54) INFRARED SENSOR

(75) Inventor: Ryuichi Kubo, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/858,766

(22) Filed: May 16, 2001

(65) Prior Publication Data

US 2002/0069909 A1 Jun. 13, 2002

(30) Foreign Application Priority Data

May 18, 2000 (JP) ........................................ 2000-146655

(51) Int. Cl.⁷ .................................................. G01J 5/12
(52) U.S. Cl. .................................. 250/338.1; 250/338.2
(58) Field of Search ........................... 250/338.1, 338.2, 250/338.3, 338.4; 136/224, 225

(56) References Cited

U.S. PATENT DOCUMENTS 6,305,840 B1 * 10/2001 Kim et al. .................... 374/133

FOREIGN PATENT DOCUMENTS

| JP | 60-46431 | 3/1985 |
| JP | 3-189526 A | 8/1991 |
| JP | 05-172629 | 7/1993 |
| JP | 8-88411 | 4/1996 |

OTHER PUBLICATIONS

"Thermopile–Zeilen– und Matrixsensorarrays fur die Positions–, Anwesenheits–und Bewegungserkennung"; Wilhelm Leneke et al.; Periodical: tm.technisches Messen, 66 (1999) 3, pp. 104–108.

"A 1024–element bulk–micromachined thermopile infrared imaging array"; Andrew D. Oliver et al.; Periodical: Sensors and actuators 73 (1999), pp. 222–231.

* cited by examiner

Primary Examiner—Constantine Hannaher
Assistant Examiner—Timothy Moran
(74) Attorney, Agent, or Firm—Keating & Bennett, LLP

(57) ABSTRACT

An infrared sensor is provided, which includes a substrate 12, a diaphragm 14 supported by the substrate, at least one thermocouple 17 provided with a cold junction 20 formed on the substrate and a hot junction 18 formed on the diaphragm, and an infrared-absorptive film 24 formed on the diaphragm so as to cover the hot junction of the thermocouple. The area of the infrared-absorptive film is 64% to 100% of the area of the diaphragm.

9 Claims, 4 Drawing Sheets

AREA OF INFRARED-ABSORPTIVE FILM/AREA OF DIAPHRAGM

INFRARED SENSOR

BACKGROUND OF THE INVENTION

1. Technical Field of the Invention

The present invention relates to infrared sensors, in particular, to an infrared sensor provided with a diaphragm structure.

2. Description of the Related Art

A known infrared sensor as a background of the present invention is disclosed in, for example, Japanese Unexamined Patent Application Publication No. 5-172629. In FIGS. 5 and 6, a known infrared sensor 1 includes a diaphragm 3 supported by a substrate 2. The diaphragm 3 is a member having a heat-insulative structure. The diaphragm 3 is provided with an infrared detector 4 including a thermistor and the like. The infrared detector 4 is disposed on the diaphragm 3 so that the range of temperature-rise in the infrared sensor is enlarged, thereby improving sensitivity and responsiveness in the infrared detection. The infrared sensor 1 is characterized in that each peripheral side of the infrared detector 4 formed in a rectangle in plan view is set to approximately ⅔ of the length of each side of the diaphragm 3 which is rectangular in plan view, in order to enlarge the range of temperature-rise in the infrared detector 4 by avoiding heat transmission from the diaphragm 3 to the supporting substrate 2, in which the area of the infrared detector 4 is approximately 44% of the area of the diaphragm 3.

PROBLEMS TO BE SOLVED BY THE INVENTION

However, in the infrared sensor 1, the amount of heat diffusing to the outside air in contact with the diaphragm 3 is larger than the amount of heat which is transmitted to the supporting substrate because the diaphragm 3 is thin and the thermal conductivity is low. Therefore, the output voltage of an infrared sensor may be triplicated when vacuum level is increased and the amount of heat diffusing to the outside air is thereby reduced, as shown in FIG. 7. In such infrared sensor, an optimum value cannot be obtained when the ratio of the length of a side of the infrared-absorptive film to that of the diaphragm is ⅔, whereby it is difficult to obtain a sensor having a large output and high sensitivity.

Accordingly, an object of the present invention is to provide an infrared sensor having a large output and high sensitivity.

SUMMARY OF THE INVENTION

An infrared sensor according to one aspect of the present invention comprises a substrate; a diaphragm supported by the substrate; at least one thermocouple provided with a cold junction formed on the substrate and a hot junction formed on the diaphragm; and an infrared-absorptive film formed on the diaphragm so as to cover the hot junction of the thermocouple. The area of the infrared-absorptive film is 64% to 100% of the area of the diaphragm.

An infrared sensor according to another aspect of the present invention comprises a substrate; a substantially rectangular diaphragm supported by the substrate; at least one thermocouple provided with a cold junction formed on the substrate and a hot junction formed on the diaphragm; and a substantially rectangular infrared-absorptive film formed on the diaphragm so as to cover the hot junction of the thermocouple. The length of a side of the substantially rectangular infrared-absorptive film is from 80% to 100% of the length of the side of the diaphragm.

An infrared sensor according to a further aspect of the present invention comprises a substrate; a substantially circular diaphragm supported by the substrate; at least one thermocouple provided with a cold junction formed on the substrate and a hot junction formed on the diaphragm; and a substantially circular infrared-absorptive film formed on the diaphragm so as to cover the hot junction of the thermocouple. The inner diameter of the substantially circular infrared-absorptive film is from 80% to 100% of the inner diameter of the diaphragm.

With the arrangements described above, the diffusion of the heat from the diaphragm to the outside air can be suppressed. The amount of heat received at the diaphragm can be increased by increasing the area of the infrared-absorptive film, thereby enlarging the range of temperature-rise in the diaphragm, whereby an infrared sensor having a large output and high sensitivity is obtainable.

The object described above, further objects, features, and advantages of the present invention will become more apparent from the following description of embodiments according to the present invention with reference to the drawings.

BRIEF DESCRIPTION OF THE DRAWING(S)

DETAILED DESCRIPTION OF EMBODIMENTS OF THE INVENTION

Figure 1:
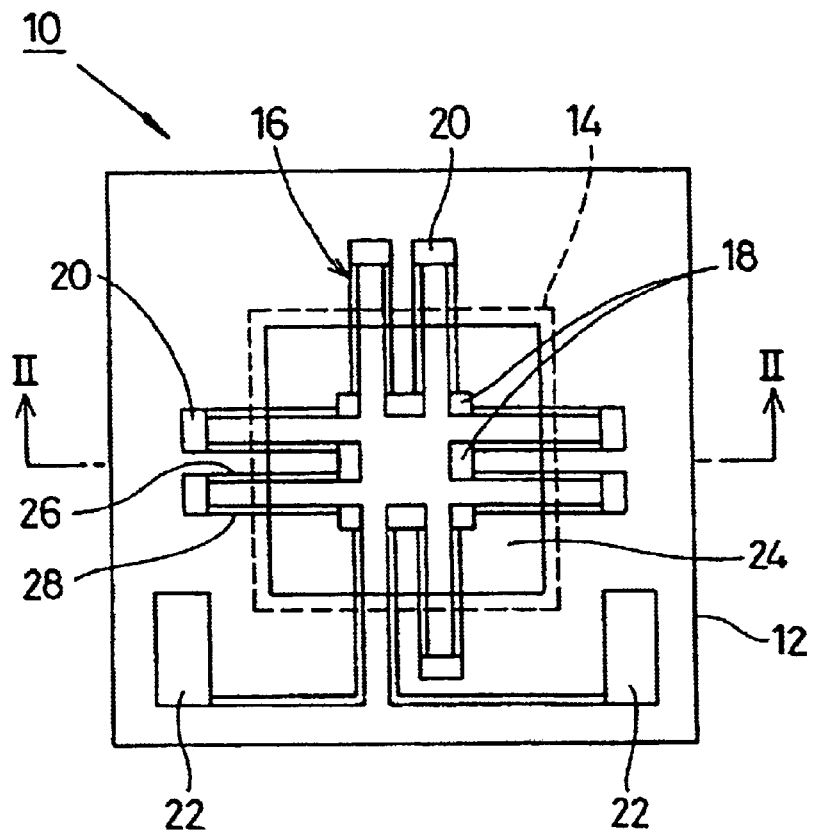
FIG. 1 is a plan view of an infrared sensor according to an embodiment of the present invention.
Figure 2:
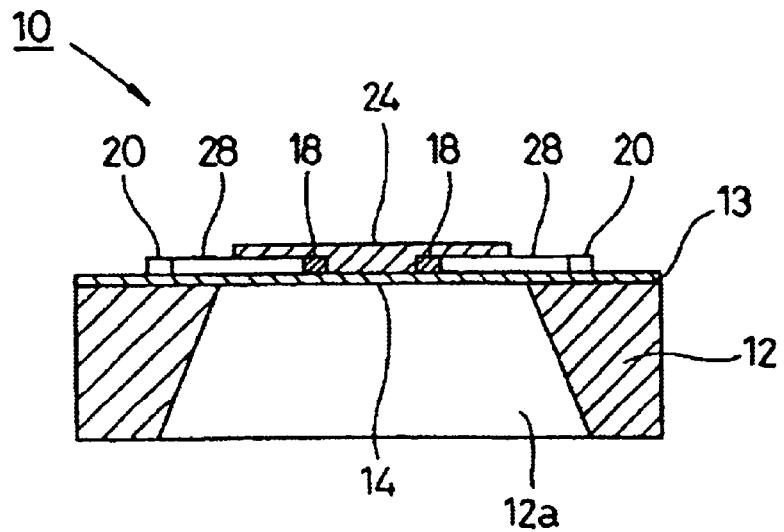
FIG. 2 is a sectional view along line II—II of the infrared sensor shown in FIG. 1.

FIG. 1 is a plan view of an infrared sensor 10 according to an embodiment of the present invention. FIG. 2 is a sectional view along line II—II of FIG. 1.

The infrared sensor 10 shown in FIGS. 1 and 2 is a thin film thermopile device which includes a substrate 12 made of, for example, Si. The substrate 12 is provided with an insulative film 13 made of, for example, silicon nitride or silicon oxide formed on the entire surface of the substrate 12. The substrate 12 is provided with a hollow part 12a formed in a rectangle in plan view substantially in a central part of the substrate 12. The insulative film 13 which covers the hollow part 12a forms a diaphragm 14. The diaphragm 14 has a heat-insulative structure which has a small thermal capacity and hardly transmits the heat in the horizontal direction.

The infrared sensor 10 includes a thermopile 16 formed with, for example, a plurality of thermocouples 17 connected either in series or in parallel to each other which includes hot junctions 18 and cold junctions 20, and thermocouple patterns. The hot junctions 18 of the thermopile 16 are disposed on the diaphragm 14 and the cold junctions 20 of the thermopile 16 are disposed on the substrate 12 around the diaphragm 14. The hot junctions 18 and the cold junctions 20 are respectively interconnected by the thermocouple patterns 17 made of, for example, a polycrystalline silicon, InSb, Sb, or Bi. A surface of the thermopile 16 is covered by a passivation film (not shown). Input-output electrodes 22 individually connected to the ends of the thermopile 16 are formed on the substrate 12 around the diaphragm 14.

The diaphragm 14 is provided with an infrared-absorptive film 24 made of, for example, NiCr, gold black, or titanium oxide is formed substantially in a rectangle in plan view and disposed on the diaphragm 14 so as to cover the hot junctions 18. The infrared-absorptive film 24 absorbs infrared light incident to the sensor and serves to effectively raise the temperature of the diaphragm 14.

A method for manufacturing the infrared sensor 10, according to another embodiment of the present invention, is described below. A planar substrate 12 is prepared. The insulative film 13 is formed on an entire surface of the substrate 12. The insulative film 13 may be deposited either in a single layer or in a plurality of layers. The thermopile 16 is formed on the insulative film 13, the thermopile 16 having a structure in which p-type thermoelectric patterns 26 and n-type thermoelectric patterns 28 are respectively connected to each other at the hot junctions 18 and the cold junctions 20. The passivation film is formed on a surface of the thermopile 16. The hollow part 12a is formed in the planar substrate 12 by anisotropically etching the planar substrate 12 substantially at a central part of the surface thereof opposite to the surface on which the thermopile 16 is disposed, whereby the diaphragm 14 is formed. The infrared-absorptive film 24 is formed on the surface of the diaphragm 14 by a mask-deposition process using a metal mask, so as to cover the hot junctions 18. The infrared-absorptive film 24 may be formed by patterning by a lift-off method instead of the mask-deposition process.

The sensor-output undesirably decreases when the infrared-absorptive film 24 covers the cold junctions 20 due to overflow of a material for the infrared-absorptive film 24 or misalignment of the infrared-absorptive film 24. Therefore, a process margin of 0% to 20% or less is preferably set in consideration of the overflow of the material for the infrared-absorptive film 24 and the misalignment of the infrared-absorptive film 24. The process margin may be zero when an effect of the overflow of the material or the misalignment is negligible.

Figure 3:
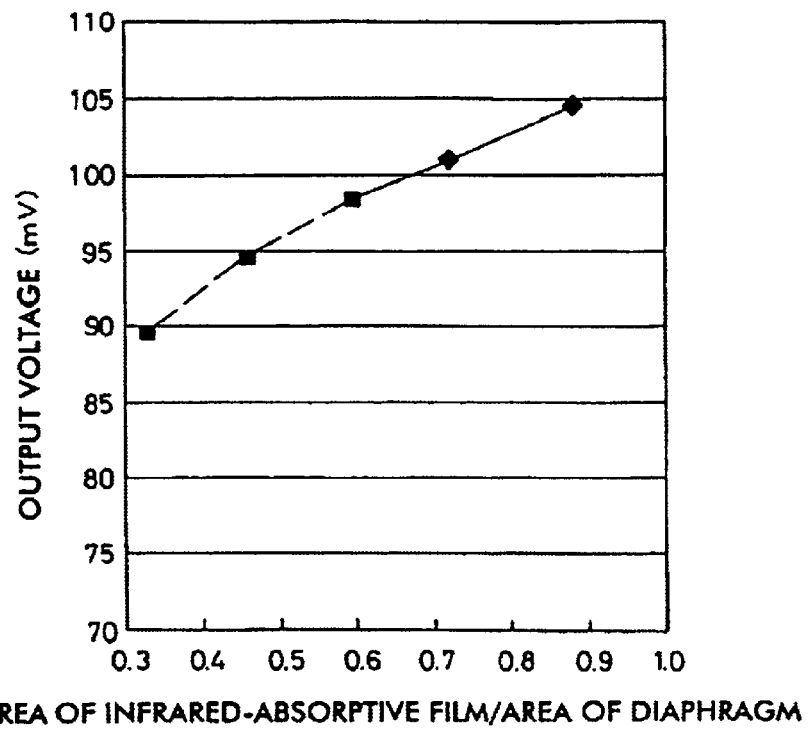
FIG. 3 is a graph in which the ratio of area of an infrared-absorptive film to a diaphragm is shown on the horizontal axis and the sensor-output is shown on the vertical axis.

FIG. 3 is a graph showing the relationship between the ratio of area of the infrared-absorptive film 24 to the diaphragm 14 and the output voltage of the infrared sensor 10. As is clearly shown in FIG. 3, the result obtained was that the output voltage of the infrared sensor 10 increased as the area of the infrared-absorptive film 24 increased.

Accordingly, the length of a side of the substantially rectangular infrared-absorptive film 24 is preferably from 80% to 100% of the length of the side of the substantially rectangular diaphragm 14, and the area of the infrared-absorptive film 24 is preferably from 64% to 100% of the area of the diaphragm 14.

Figure 4:
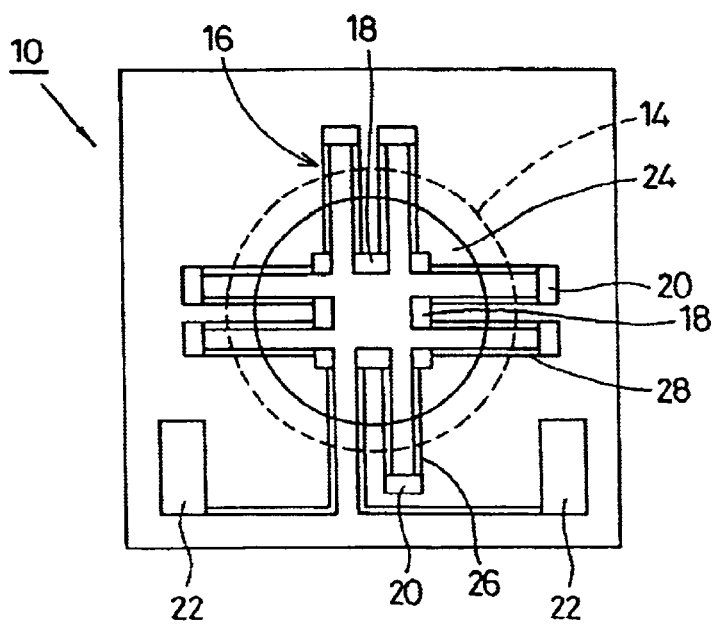
FIG. 4 is a plan view of an infrared sensor according to another embodiment of the present invention.
Figure 5:
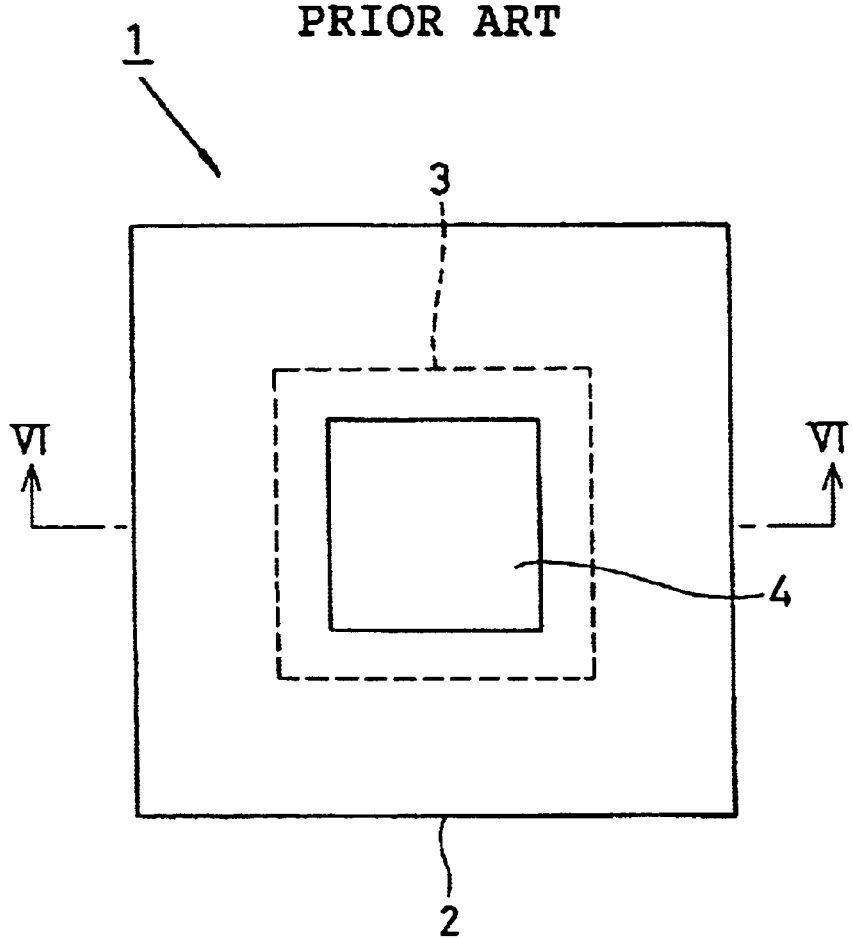
FIG. 5 is a plan view of a known infrared sensor as a background of the present invention.
Figure 6:
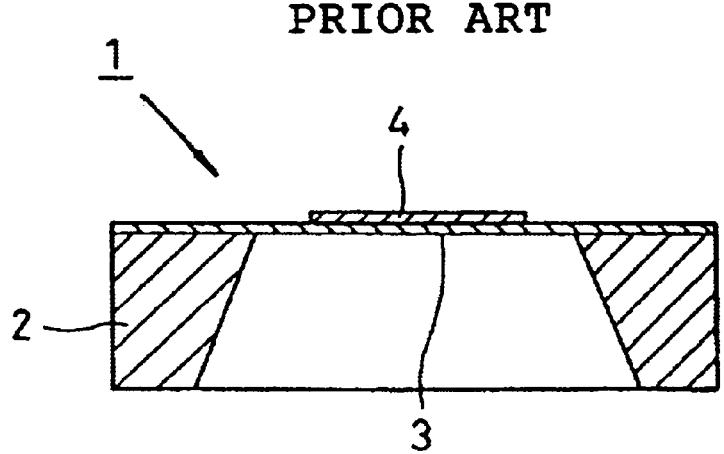
FIG. 6 is a sectional view along line VI—VI of the infrared sensor shown in FIG. 5.
Figure 7:
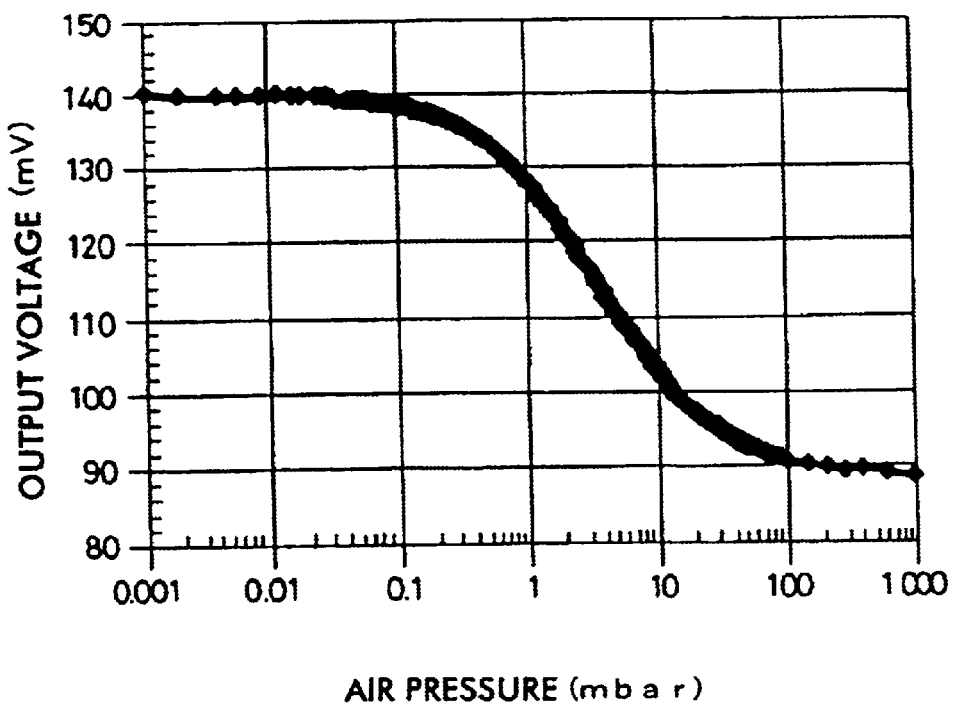
FIG. 7 is a graph showing the relationship between the output voltage of the infrared sensor having a known diaphragm structure and air pressure.

FIG. 4 is a plan view of an infrared sensor according to another embodiment of the present invention. The infrared sensor 10 shown in FIG. 4 differs from that shown in FIG. 1 only in that the diaphragm 14 and the infrared-absorptive film 24 are each formed substantially in a circle in plan view. In this case, the diameter of the infrared-absorptive film 24 is preferably 80% to 100% of the diameter of the diaphragm 14, and the area of the infrared-absorptive film 24 is preferably from 64% to 100% of the area of the diaphragm 14 because of the same reason as that which is described in the embodiment shown in FIG. 1.

According to the present invention, an infrared sensor having a large sensor-output and high sensitivity is obtainable.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An infrared sensor comprising:

a substrate;

a diaphragm supported by said substrate;

at least one thermocouple provided with a cold junction formed on said substrate and a hot junction formed on said diaphragm; and an infrared-absorptive film formed on said diaphragm so as to cover the hot junction of the thermocouple, wherein the area of the infrared-absorptive film is 64% to 100% of the area of said diaphragm.

2. An infrared sensor as claimed in claim 1, further comprising a passivation film covering an entire surface of the at least one thermocouple.

3. An infrared sensor as claimed in claim 1, wherein a portion of the infrared-absorptive film directly contacts the diaphragm.

4. An infrared sensor comprising:

a substrate;

a substantially rectangular diaphragm supported by said substrate;

at least one thermocouple provided with a cold junction formed on said substrate and a hot junction formed on said diaphragm; and a substantially rectangular infrared-absorptive film formed on said diaphragm so as to cover the hot junction of the thermocouple, wherein the length of a side of the substantially rectangular infrared-absorptive film is 8/10 to 10/10 of the length of the aide of said diaphragm.

5. An infrared sensor as claimed in claim 4, further comprising a passivation film covering an entire surface of the at least one thermocouple.

6. An infrared sensor as claimed in claim 4, wherein a portion of the infrared-absorptive film directly contacts the diaphragm.

7. An infrared sensor comprising:

a substrate;

a substantially circular diaphragm supported by said substrate;

at least one thermocouple provided with a cold junction formed on said substrate and a hot junction formed on said diaphragm; and a substantially circular infrared-absorptive film formed on said diaphragm so as to cover the hot junction of the thermocouple, wherein the inner diameter of the substantially circular infrared-absorptive film is from 80% to 100% of the inner diameter of said diaphragm.

8. An infrared sensor as claimed in claim 7, further comprising a passivation film covering an entire surface of the at least one thermocouple.

9. An infrared sensor as claimed in claim 7, wherein a portion of the infrared-absorptive film directly contacts the diaphragm.

* * * * *